(12) United States Patent
Wu et al.

(10) Patent No.: US 11,412,560 B2
(45) Date of Patent: Aug. 9, 2022

(54) SIDELINK UNICAST COMMUNICATION SCHEDULING

(71) Applicant: QUALCOMM Incorporated, San Diego, CA (US)

(72) Inventors: Zhibin Wu, Los Altos, CA (US); Kapil Gulati, Hillsborough, NJ (US); Hong Cheng, Bridgewater, NJ (US); Sudhir Kumar Baghel, Hillsborough, NJ (US); Junyi Li, Chester, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 93 days.

(21) Appl. No.: 16/862,346

(22) Filed: Apr. 29, 2020

(65) Prior Publication Data
US 2020/0351964 A1    Nov. 5, 2020

Related U.S. Application Data

(60) Provisional application No. 62/842,385, filed on May 2, 2019.

(51) Int. Cl.
| H04W 76/14 | (2018.01) |
| H04W 72/12 | (2009.01) |
| H04W 92/18 | (2009.01) |

(52) U.S. Cl.
CPC ....... *H04W 76/14* (2018.02); *H04W 72/1236* (2013.01); *H04W 72/1278* (2013.01); *H04W 92/18* (2013.01)

(58) Field of Classification Search
None
See application file for complete search history.

(56) References Cited

U.S. PATENT DOCUMENTS

| 2016/0157185 A1* | 6/2016 | Chae | H04W 72/1278 |
| | | | 370/311 |
| 2016/0183276 A1* | 6/2016 | Marinier | H04W 72/12 |
| | | | 370/329 |

(Continued)

FOREIGN PATENT DOCUMENTS

| EP | 3242515 A1 * | 11/2017 | H04L 5/0053 |
| WO | WO-2016163972 A1 * | 10/2016 | H04W 76/02 |

OTHER PUBLICATIONS

International Search Report and Written Opinion—PCT/US2020/030633—ISA/EPO—dated Jul. 24, 2020.

(Continued)

*Primary Examiner* — Nicholas Sloms
(74) *Attorney, Agent, or Firm* — Harrity & Harrity LLP/Qualcomm Incorporated

(57) ABSTRACT

Techniques are provided for supporting sidelink communication between multiple user equipment (UEs), and which may be implemented in various apparatuses, methods, and/or articles of manufacture. In certain aspects a first UE may establish a sidelink schedule with a second UE, wherein the sidelink schedule corresponds to at least a subset of communication resources indicated available to both the first and second UEs by one or more corresponding link availability schedules or the like. The two UEs may then establish a sidelink with the second UE in accordance with the sidelink schedule. Multiple sidelink schedules may be agreed upon in certain instances such that the UEs may dynamically switch from one schedule to another as desired.

30 Claims, 7 Drawing Sheets

(56) References Cited

U.S. PATENT DOCUMENTS

| | | | |
|---|---|---|---|
| 2018/0070252 A1* | 3/2018 | Gupta | H04W 48/16 |
| 2018/0376525 A1 | 12/2018 | Feng | |
| 2019/0124015 A1* | 4/2019 | Loehr | H04W 28/0284 |
| 2019/0182840 A1* | 6/2019 | Feng | H04W 74/0816 |
| 2020/0120458 A1* | 4/2020 | Aldana | H04W 72/048 |
| 2020/0351975 A1* | 11/2020 | Tseng | H04L 5/001 |

OTHER PUBLICATIONS

PANASONIC: "Discussion on Supporting Unicast, Groupcast and Broadcast via NR Sidelink," 3GPP Draft, 3GPP TSG RAN WG1 Meeting #94bis, R1-1810951, 3rd Generation Partnership Project (3GPP), Mobile Competence Centre, 650, Route Des Lucioles, F-06921, Sophia-Antipolis Cedex, France, vol. RAN WG1, No. Chengdu, China; Oct. 8, 2018-Oct. 12, 2018, Sep. 28, 2018 (Sep. 28, 2018), XP051518356, 4 pages, Retrieved from the Internet: URL: http://www.3gpp.org/ftp/tsg%5Fran/WG1%5FRL1/TSGR1%5F94b/Docs/R1%2D1810951%2Ezip [retrieved on Sep. 28, 2018] the whole document.

VIVO: "Signaling Procedure Details for Sidelink Unicast Connection Setup," 3GPP Draft, 3GPP TSG-RAN WG2 Meeting #105bis, R2-1903634, Signaling Procedure Details for Sidelink Unicast Connection Setup, 3rd Generation 2D1903634%2Ezip [retrieved on Apr. 6, 2019], the whole document. Partnership Project (3GPP), Mobile Competence Centre, 650, Route Des Lucioles, F-06921, Sophia-Antipolis Cedex, France, vol. RAN WG2, No. Xi'an, China, Apr. 8, 2019-Apr. 12, 2019, Apr. 6, 2019 (Apr. 6, 2019), XP051700976, 6 pages, Retrieved from the Internet:URL: http://www.3gpp.org/ftp/Meetings%5F3GPP%5FSYNC/RAN2/Docs/R2%.

* cited by examiner

| Configuration | Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

```
┌─────────────────────────────────────────────────────────────┐
│ Obtain a link availability schedule indicating, at least in │
│ part, communication resources available for use by at least │
│ the first UE for sidelink unicast communication             │
└─────────────────────────────────────────────────────────────┘
                              902
                              ▼
┌─────────────────────────────────────────────────────────────┐
│ Identify a second UE to attempt to engage in a sidelink     │
│ unicast communication                                        │
└─────────────────────────────────────────────────────────────┘
                              904
                              ▼
┌─────────────────────────────────────────────────────────────┐
│ Establish a sidelink schedule with the second UE, the       │
│ sidelink schedule corresponding to at least a subset of the │
│ communication resources indicated by the link availability  │
│ schedule                                                     │
│                                                              │
│  ┌──────────────────┐   ┌─────────────────────────────┐     │
│  │ Exchange sidelink│   │ Identify that one of two or │     │
│  │ negotiation      │   │ more candidate sidelink     │     │
│  │ information with │   │ schedules is to serve as    │     │
│  │ the second UE    │   │ the sidelink schedule       │     │
│  └──────────────────┘   └─────────────────────────────┘     │
│         908                          912                     │
│  ┌──────────────────┐   ┌─────────────────────────────┐     │
│  │ Receive sidelink │   │ Receive an indication from  │     │
│  │ negotiation      │   │ the second UE that one of   │     │
│  │ information from │   │ two or more candidate       │     │
│  │ the second UE    │   │ sidelink schedules is to    │     │
│  │                  │   │ serve as the sidelink       │     │
│  │                  │   │ schedule                    │     │
│  └──────────────────┘   └─────────────────────────────┘     │
│         910                          914                     │
└─────────────────────────────────────────────────────────────┘
                              906
                              ▼
┌─────────────────────────────────────────────────────────────┐
│ Establish a sidelink with the second UE                     │
└─────────────────────────────────────────────────────────────┘
                              908
                              ▼
┌─────────────────────────────────────────────────────────────┐
│ Communicate, via the sidelink, with the second UE using at  │
│ least a portion of the communication resources per the      │
│ sidelink schedule                                            │
└─────────────────────────────────────────────────────────────┘
                              918
```

FIG. 9

SIDELINK UNICAST COMMUNICATION SCHEDULING

CLAIM OF PRIORITY UNDER 35 U.S.C. § 119

This application claims the benefit of U.S. Provisional Patent Application No. 62/842,385, filed May 2, 2019, which is incorporated by reference herein in its entirety.

BACKGROUND

The following relates generally to wireless communications, and more specifically to sidelink communication.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include a number of base stations or network access nodes, each simultaneously supporting communication for multiple communication devices, which may be otherwise known as user equipment (UE).

In some wireless communications systems, communications may occur directly between UEs, e.g., in a device-to-device (D2D) or peer-to-peer (p2P) manner, often using communication resources shared by one or more networks that may serve such or other like UEs. Some such communication in 5G NR may, for example, be referred to as unicast sidelink communication. In some implementations, sidelink communication may be conducted by two UEs using communication resources that may be allocated by a network for an individual UE usage, or otherwise allocated in some shared manner to multiple UEs. A unicast sidelink may be limited to half-duplex communication between a pair of UEs in situations wherein the at least one of the UEs is unable to transmit and receive signals simultaneously. Moreover, there may be situations wherein a transmitting UE may need to retransmit data messages which may be missed by a receiving UE that may have been transmitting signals itself and hence not receiving or may have been tuned to receive other signals via resources (e.g., time and frequency based slots, etc.) that may not have included the signal from the transmitting UE. Likewise, if other devices may use shared resources for still other communications, there may be signal interferences that also lead to retransmission by the transmitting UE. Accordingly, improved techniques may be beneficial by improving efficient use of resources, for example, by reducing retransmissions.

SUMMARY

In accordance with certain aspects, a method is provided for use in establishing sidelink unicast communication, for example, between a first user equipment (UE) and a second UE. For example, the first UE may be configured to perform a method comprising: obtaining a link availability schedule indicating, at least in part, communication resources available for use by at least the first UE for sidelink unicast communication; identifying a second UE to attempt to engage in a sidelink unicast communication; establishing a sidelink schedule with the second UE, the sidelink schedule corresponding to at least a subset of the communication resources indicated by the link availability schedule; establishing a sidelink with the second UE; and communicating, via the sidelink, with the second UE using at least a portion of the communication resources per the sidelink schedule.

In accordance with certain other aspects, a (first) UE may be provided which includes at least a transceiver, memory and one or more processing units coupled to the transceiver and memory and wherein the one or more processing units are configured to: access a link availability schedule stored in the memory which indicates, at least in part, communication resources available for use by at least the first UE for sidelink unicast communication; identify a second UE to attempt to engage in a sidelink unicast communication; communicate, via the transceiver with the second UE, to establish a sidelink schedule corresponding to at least a subset of the communication resources indicated by the link availability schedule; and communicate, via the transceiver, with the second UE over a sidelink using at least a portion of the communication resources per the sidelink schedule.

In accordance with still other aspects, an apparatus is provided for use at a (first) UE for sidelink unicast communication. The apparatus may comprise: means for obtaining a link availability schedule indicating, at least in part, communication resources available for use by at least the first UE for sidelink unicast communication; means for identifying a second UE to attempt to engage in a sidelink unicast communication; means for establishing a sidelink schedule with the second UE, the sidelink schedule corresponding to at least a subset of the communication resources indicated by the link availability schedule; means for establishing a sidelink with the second UE; and means for communicating, via the sidelink, with the second UE using at least a portion of the communication resources per the sidelink schedule.

In accordance with yet other aspects, an article of manufacture is provided which comprises: a non-transitory computer readable medium having stored therein instructions executable by one or more processing units of a (first) UE to: access a link availability schedule that indicates, at least in part, communication resources available for use by at least the first UE for sidelink unicast communication; identify a second UE to attempt to engage in a sidelink unicast communication; initiate communication with the second UE to establish a sidelink schedule corresponding to at least a subset of the communication resources indicated by the link availability schedule; and initiate communication with the second UE over a sidelink using at least a portion of the communication resources per the sidelink schedule.

BRIEF DESCRIPTION OF THE DRAWINGS

FIG. 4 illustrates portions of an example resource map that may be indicative, at least in part, of information for a link availability schedule or other like communication resource allocation for a UE, in accordance with certain aspects of the present disclosure.

FIG. 9 is a flow-diagram illustrating an example method for use in a UE, for example, as in FIG. 2, configured for sidelink unicast communication based, at least in part, on one or more sidelink schedule(s), in accordance with certain aspects of the present disclosure.

DETAILED DESCRIPTION

Figure 1:
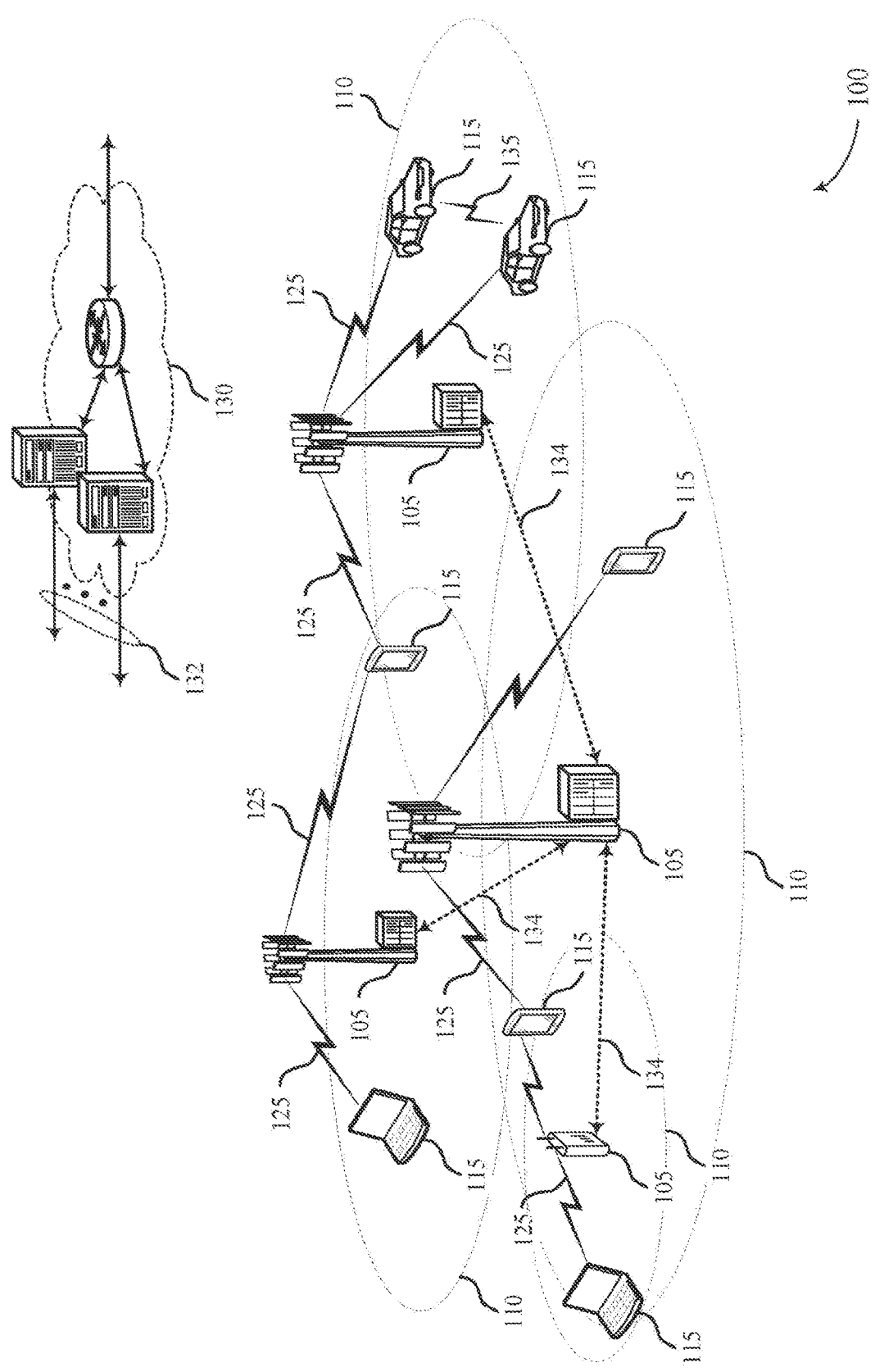
FIG. 1 illustrates an example of a system for wireless communications having user equipment (UE) configured for sidelink unicast communication or the like, in accordance with certain aspects of the present disclosure.

As described in greater detail in the description and examples herein, techniques are provided that may improve the efficiency of sidelink unicast communication, for example, by allowing UEs to establish and/or otherwise make use of a sidelink schedule. In certain instances, the use of a sidelink schedule may reduce retransmissions.

By way of an initial example, a first UE may comprise a sidelink scheduler configured to access or otherwise obtain a link availability schedule indicating, at least in part, communication resources that may be available for use by at least the first UE for sidelink unicast communication. In certain example implementations, all or part of a link availability schedule may be obtained from a network resource and indicate, at least in part, communication resources that may be allocated to the first UE or otherwise allocated for sharing by the first UE. When the first UE has identified a second UE to attempt to engage in a sidelink unicast communication, the sidelink scheduler may establish one or more sidelink schedules with the second UE. Here, for example, a sidelink schedule may correspond to at least a subset of the communication resources indicated by the link availability schedule. The UE may subsequently establish and use a sidelink with the second UE based on the sidelink schedule.

In certain instances, to establish the sidelink schedule comprises one or both of the UEs may exchange sidelink negotiation information some of which may be based, at least in part, on the link availability schedule. For example, as part of exchanging sidelink negotiation information with the second UE, a first UE may receive sidelink negotiation information from the second UE, which may correspond to a link availability schedule applicable to the second UE. In certain example implementations, at least a portion of the sidelink negotiation information may be indicative of at least one quality of service (QoS) parameter or the like, corresponding to the sidelink unicast communication. As presented by way of example herein, at least a portion of the sidelink negotiation information that may be exchanged may be exchanged as part of an RRC procedure, a MAC procedure, and/or other like protocol layer(s), or some combination there.

In certain example implementations, a sidelink schedule that may be negotiated or otherwise established may comprise two or more candidate sidelink schedules that may be acceptable to the first UE and the second UE. Thus, for example, one or both of the UEs may be configured to identify that a particular candidate sidelink schedule is to be used (e.g., serve as the sidelink schedule). For example, a first UE may send or receive an indication that a particular candidate sidelink schedule is to serve as the sidelink schedule.

While a sidelink schedule may be indicative of a specific resource available for a first UE to transmit signals over the sidelink to the second UE, the first UE may actually be configured to use the specific resource to transmit one or more signals to a device other than the second UE, or perhaps receive one or more signals from another device, or possibly some combination thereof. Similar capabilities may exist for the second UE to perform other communications that may not actually involve the first UE. Similarly, a sidelink schedule may be indicative of specific resources for use by the first UE to receive signals over the sidelink from the first UE, or vice versa.

As mentioned, a sidelink schedule may correspond to at least a subset of the communication resources indicated by the link availability schedule. By way of an example, a subset of the communication resources may correspond to at least one subframe of at least one slot indicated by the link availability schedule. Here, for example, slots may be indicative of resources by time and frequency. A sidelink schedule may be indicative of a communication resource granularity (time, frequency, or both). A sidelink schedule may be indicative of a network-related timing offset or the like for at least one communication resource for the sidelink unicast communication.

In certain instances, a sidelink may comprise a single unidirectional sidelink, at least two unidirectional sidelinks arranged in reversed directions so as to provide bidirectional communication, a bidirectional sidelink, or some combination thereof. In certain instances, a sidelink may comprise a PC5 or other like communication link.

Attention is now drawn to FIG. 1, which illustrates an example of a wireless communications system 100 that supports sidelink establishment in accordance with aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation NodeB or giga-NodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

Wireless communications system 100 may support direct communication between UEs 115 over a sidelink 135 (e.g., using a peer-to-peer (P2P), device-to-device (D2D) protocol, ProSe direct communications). Sidelink communication may be used for D2D media-sharing, vehicle-to-vehicle (V2V) communication, V2X communication (e.g., cellular V2X (cV2X) communication, enhanced V2X (eV2X) communication, etc.), emergency rescue applications, etc. One or more of a group of UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105, e.g., particularly using the techniques presented herein for sidelink scheduling.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that may be capable of tolerating interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a carrier aggregation configuration in conjunction with component carriers operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a first UE 115 of a sidelink connection) and a receiving device (e.g., a second UE 115 of a sidelink connection), where the transmitting device is equipped with multiple antennas and the receiving device is equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 or UE 115 may use multiple antennas or antenna arrays to conduct beamforming operations for directional communications with a UE 115 recipient. For instance, some signals (e.g. synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105, a first UE 115, or a receiving device, such as a second UE 115) a beam direction for subsequent transmission and/or reception by the base station 105.

Some signals, such as data signals associated with a particular receiving device, may be transmitted by a base station 105 or a first UE 115 in a single beam direction (e.g., a direction associated with the receiving device, such as a second UE 115). In some examples, the beam direction associated with transmissions along a single beam direction may be determined based at least in in part on a signal that was transmitted in different beam directions. For example, a receiving UE 115 may receive one or more of the signals transmitted by a base station 105 or a transmitting UE 115 in different directions, and the receiving UE 115 may report to the base station 105 or the transmitting UE 115 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or PDCP layer may be IP-based. In cases where D2D or V2X communications are used, a V2X layer may provide related protocols, and in some cases may use ProSe direct communications protocols (e.g., PC5 signaling). A RLC layer may perform packet segmentation and reassembly to communicate over logical channels. A MAC layer may perform priority handling and multiplexing of logical channels into transport channels. The MAC layer may also use hybrid automatic repeat request (HARQ) to provide retransmission at the MAC layer to improve link efficiency. In the control plane, the RRC protocol layer may provide establishment, configuration, and maintenance of an RRC connection between a UE 115 and a base station 105 or core network 130 supporting radio bearers for user plane data. At the PHY layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200\ T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an evolved universal mobile telecommunication system terrestrial radio access (E-UTRA) absolute radio frequency channel number (EARFCN)) and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as orthogonal frequency division multiplexing (OFDM) or discrete Fourier transform spread OFDM (DFT-S-OFDM)).

The organizational structure of the carriers may be different for different radio access technologies (e.g., LTE, LTE-A, LTE-A Pro, NR). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth or may be configurable to support communications over one of a set of carrier bandwidths. In some examples, the wireless communications system 100 may include base stations 105 and/or UEs 115 that support simultaneous communications via carriers associated with more than one different carrier bandwidth.

Wireless communications system 100 may support communication with a UE 115 on multiple cells or carriers, a feature which may be referred to as carrier aggregation or multi-carrier operation. A UE 115 may be configured with multiple downlink component carriers and one or more uplink component carriers according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other component carriers, which may include use of a reduced symbol duration as compared with symbol durations of the other component carriers. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications system 100 may be an NR system that may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across the frequency domain) and horizontal (e.g., across the time domain) sharing of resources.

In some wireless communications systems, data transmissions (e.g., target traffic) may be periodically broadcasted from a UE 115 or base station 105. For example, in V2X communications, a vehicle (e.g., or a UE 115) may broadcast safety messages (with a known size) periodically to enable nearby vehicles, sensors, or additional UEs 115 to receive necessary information about the transmitting vehicle.

Wireless communications system 100 may support efficient techniques for establishing a unicast link (e.g., connection) between two wireless devices (e.g., UEs 115, vehicles, sensors, etc.). For example, a connection-oriented link may be established by a V2X layer of a protocol stack between the two wireless devices that supports an optimized AS layer configuration (e.g., over-the-air) for higher throughput (e.g., 64 quadrature amplitude modulation (QAM), CA, etc.), supports enhanced security protection, and allows more efficient resource usage (e.g., power control, beam management, etc.). In some cases, the unicast connection may be established over a sidelink 135 between the two wireless devices, for example, without going through a base station. To establish the unicast connection over the sidelink 135, a first UE 115 may transmit a request message to a second UE 115, and the second UE 115 may transmit a response message accepting the request to the first UE 115.

Additionally, the first UE 115 may transmit a connection complete message to the second UE 115 and establish a security context with the second UE 115 as part of establishing a connection over the sidelink 135. In some cases, the request message, the response message, and the connection complete message may be transmitted via RRC signaling (e.g., over PC5 to have unified PC5 and Uu management). Additionally, a connection may be established based on parameters (e.g., capabilities, connection parameters, etc.) for the first UE 115 and/or the second UE 115 that are transmitted in the respective request message and/or response message. For example, the parameters may include PDCP parameters, RLC parameter, MAC parameters, PHY layer parameters, capabilities of either UE 115, or a combination thereof. Such communications may be performed as part of a link management process.

Figure 2:
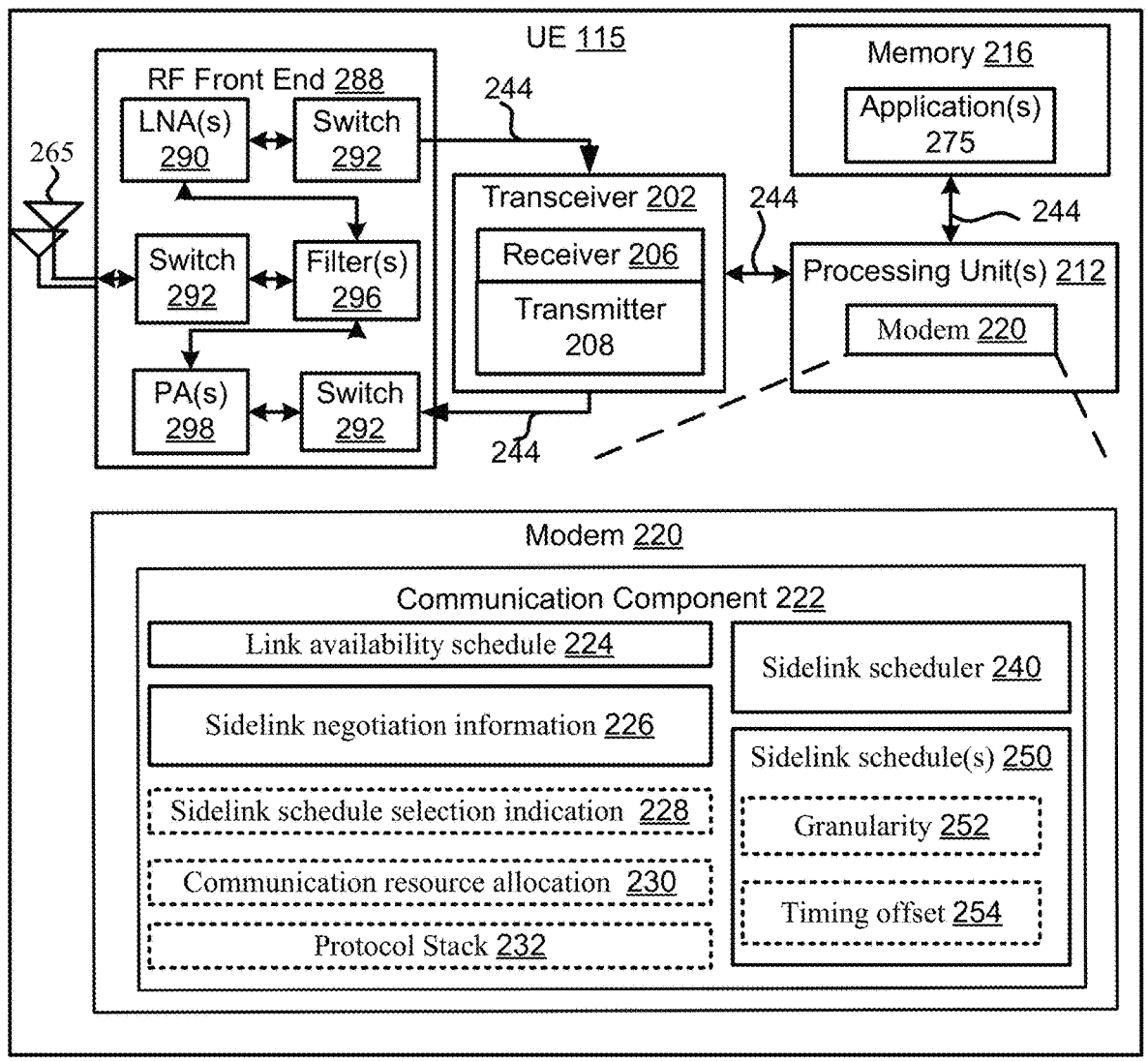
FIG. 2 is a block diagram illustrating some features of an apparatus for use in a UE configured for sidelink unicast communication based, at least in part, on one or more sidelink schedule(s) negotiated with a peer UE, in accordance with certain aspects of the present disclosure.

Attention is drawn next to FIG. 2, which is a block diagram illustrating some features of an apparatus for use in a UE configured for sidelink unicast communication based, at least in part, on one or more sidelink schedule(s) negotiated with a peer UE, in accordance with certain aspects of the present disclosure Referring to FIG. 2, one example of an implementation of the UE 115 may include a variety of components including components such as one or more processing units 212 and memory 216 and transceiver 202 in communication via one or more buses 244, which may operate in conjunction with the modem 220 and the communication component 222 to enable one or more of the functions described herein related to V2X and related communications. Further, the one or more processing unit(s) 212, modem 220, memory 216, transceiver 202, RF front end 288 and one or more antennas 265, may be configured to support voice and/or data calls (simultaneously or non-simultaneously) in one or more radio access technologies.

In an aspect, the one or more processing unit(s) 212 may include modem 220 that uses one or more modem processors. The various functions related to a communication component 222 may be included or otherwise implemented, at least in part, in modem 220 and/or processing unit(s) 212 and, in an aspect, may be executed by a single processor, while in other aspects, different ones of the functions may be executed by a combination of two or more different processors. For example, in an aspect, the one or more processing unit(s) 212 may include any one or any combination of a modem processor, or a baseband processor, or a digital signal processor, or a transmit processor, or a receiver processor, or a transceiver processor associated with transceiver 202. In other aspects, some of the features of the one or more processing unit(s) 212 and/or the modem 220 associated with the communication component 222 may be performed by transceiver 202.

Also, memory 216 may be configured to store data used herein and/or local versions of applications 275 for the communication component 222 and/or one or more subcomponents of the communication component 222 being executed by at least one processing unit(s) 212. Memory 216 can include any type of computer-readable medium usable by a computer or at least one processing unit(s) 212, such as random access memory (RAM), read only memory (ROM), tapes, magnetic discs, optical discs, volatile memory, non-volatile memory, and any combination thereof. In an aspect, for example, memory 216 may be a non-transitory computer-readable storage medium that stores one or more computer-executable codes defining all or part of communication component 222 and/or one or more of its subcomponents, and/or data associated therewith, when UE 115 is operating at least one processing unit(s) 212 to execute the communication component 222 and/or one or more of its subcomponents.

Transceiver 202 may include at least one receiver 206 and at least one transmitter 208. Receiver 206 may include hardware, firmware, and/or software code executable by a processor for receiving data, the code comprising instructions and being stored in a memory (e.g., computer-readable medium). Receiver 206 may be, for example, a radio frequency (RF) receiver. In an aspect, receiver 206 may receive signals transmitted by at least one base station 105. Transmitter 208 may include hardware, firmware, and/or software code executable by a processor for transmitting data, the code comprising instructions and being stored in a memory (e.g., computer-readable medium). A suitable example of transmitter 208 may including, but is not limited to, an RF transmitter.

Moreover, in an aspect, UE 115 may include RF front end 288, which may operate in communication with one or more antennas 265 and transceiver 202 for receiving and transmitting radio transmissions, for example, wireless communications transmitted by at least one base station 105 or wireless transmissions transmitted by UE 115. RF front end 288 may be coupled with one or more antennas 265 and can include one or more low-noise amplifiers (LNAs) 290, one or more switches 292, one or more power amplifiers (PAs) 298, and one or more filters 296 for transmitting and receiving RF signals.

In an aspect, LNA 290 can amplify a received signal at a desired output level. In an aspect, each LNA 290 may have a specified minimum and maximum gain values. In an aspect, RF front end 288 may use one or more switches 292 to select a particular LNA 290 and the specified gain value based on a desired gain value for a particular application.

Further, for example, one or more PA(s) 298 may be used by RF front end 288 to amplify a signal for an RF output at a desired output power level. In an aspect, each PA 298 may have specified minimum and maximum gain values. In an aspect, RF front end 288 may use one or more switches 292 to select a particular PA 298 and the specified gain value based on a desired gain value for a particular application.

Also, for example, one or more filters 296 can be used by RF front end 288 to filter a received signal to obtain an input RF signal. Similarly, in an aspect, for example, a respective filter 296 can be used to filter an output from a respective PA 298 to produce an output signal for transmission. In an aspect, each filter 296 can be coupled with a specific LNA 290 and/or PA 298. In an aspect, RF front end 288 can use one or more switches 292 to select a transmit or receive path using a specified filter 296, LNA 290, and/or PA 298, based on a configuration as specified by transceiver 202 and/or processing unit(s) 212.

As such, transceiver 202 may be configured to transmit and receive wireless signals through one or more antennas 265 via RF front end 288. In an aspect, transceiver may be tuned to operate at specified frequencies such that UE 115 can communicate with, for example, one or more base stations 105 or one or more cells associated with one or more base stations 105. In an aspect, for example, the modem 220 can configure transceiver 202 to operate at a specified frequency and power level based on the UE configuration of the UE 115 and the communication protocol used by the modem 220.

In an aspect, the modem 220 can be a multiband-multi-mode modem, which can process digital data and communicate with transceiver 202 such that the digital data is sent and received using transceiver 202. In an aspect, the modem 220 can be multiband and be configured to support multiple frequency bands for a specific communications protocol. In an aspect, the modem 220 can be multimode and be configured to support multiple operating networks and communications protocols. In an aspect, the modem 220 can control one or more components of UE 115 (e.g., RF front end 288, transceiver 202) to enable transmission and/or reception of signals from the network based on a specified modem configuration. In an aspect, the modem configuration can be based on the mode of the modem and the frequency band in use. In another aspect, the modem configuration can be based on UE configuration information associated with UE 115 as provided by the network during cell selection and/or cell reselection.

As illustrated in FIG. 2, an example communication component 222 may comprise a sidelink scheduler 240 that may be configured to perform all or part of the techniques presented herein, e.g., based, at least in part, on a link availability schedule 224, sidelink negotiation information 226, or some combination thereof. Sidelink scheduler 240 may generate or otherwise provide one or more sidelink schedules 250, which may comprise or otherwise be based on a granularity 252, timing offset 254, or some combination thereof which may be useful in providing UE 115 with adequate information for communicating over a sidelink. In certain instances, a sidelink schedule selection indication 228 may be provided for determining which of the sidelink schedules 250 to use for sidelink communication. A sidelink schedule selection indication 228 may, for example, be set by the first UE and shared with the second UE, or vice versa. A communication resource allocation 230 may be used to determine a link availability schedule, and may be received from a network or other like external resource in certain example implementations. Also, as illustrated, a protocol stack 232 may be provided which includes one or more layers that may be used by the techniques herein.

Figure 3:
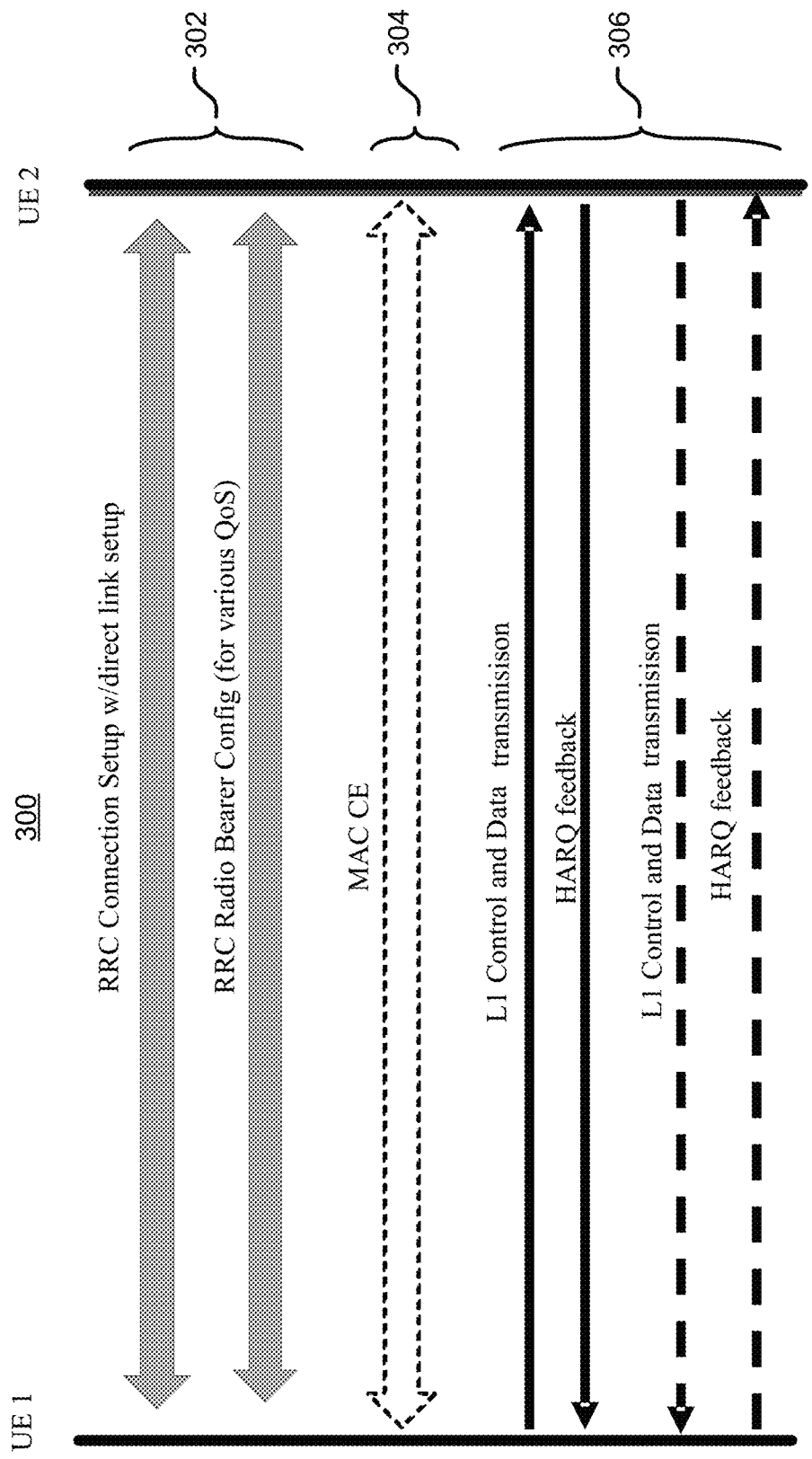
FIG. 3 is a timeline illustrating some example signaling between two UEs that may be used to establish sidelink unicast communication therebetween, in accordance with certain aspects of the present disclosure.

With this in mind attention is drawn next to FIG. 3, which is a timeline 300 illustrating some example signaling processes between two UEs (labeled UE1 and UE2) that may be used to establish sidelink unicast communication therebetween, in accordance with certain aspects of the present disclosure. An example process 302 is represented by a first message exchange comprising an RRC Connection Setup with direct link setup, and a second message exchange comprising a RRC Radio Bearer Config (for various QoS). Another example process 304 is represented by a message exchange comprising a MAC CE. Finally, an example process 306 is represented by L1 control and data transmission(s) and corresponding HARQ feedback transmissions.

In timeline 300, a PC5 interface is illustrated as an example that may be employed to support the techniques presented herein.

FIG. 4 illustrates portions of an example resource map 400 that may be indicative, at least in part, of information for communication resource allocation 320, a link availability schedule 224, and/or the like, in accordance with certain aspects of the present disclosure. By way of an example, an LTE/NR, TDD config may comprise a map indicating to a UE which slot is used for UL and which slot is used for DL, e.g., partial resource map 400 lists different subframes as allocated for uplink communication (marked "U"), downlink communication (marked "D"), or not used (marked "U").

Figure 5:
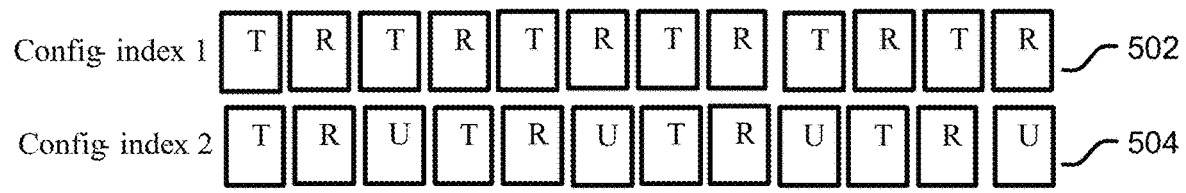
FIG. 5 illustrates some example link availability schedules for a UE, in accordance with certain aspects of the present disclosure.

FIG. 5 illustrates some example link availability schedules 500 for a UE, in accordance with certain aspects of the present disclosure. For example, for a Config-index1 example link availability schedule 502 shows a sequence of blocks representing all or part of one or more slots (e.g., depending on granularity) corresponding to communication resources (e.g., corresponding to time and frequency characteristics). In this example all of the blocks may be used for either transmission or reception. Here, for example, "T" represents an ability to transmit, "R" represents an ability to receive. Similarly, in a Config-index 2 example link availability schedule 504 shows a sequence of blocks representing all or part of one or more slots (e.g., depending on granularity) corresponding to communication resources (e.g., corresponding to time and frequency characteristics). Here, for example, in addition to "T" and "R" blocks, a "U" block is included which represents not available or not used (at least for the sidelink communication).

In certain example implementations as part of a sidelink scheduler 240 (see FIG. 2), an RRC process or other like sidelink establishment procedure may be configured to support a unidirectional flow case, e.g., wherein a transmitting (TX) UE needs to know a receiving (RX) UE's link availability schedule. For a certain QoS for sidelink unicast flow, AS layer parameters may be configured for a DRB (Data radio bearer) before the data transport can occur. Here, for example, part of a MAC-config may be used to decide/configure the "link availability" which limits the TX UE's arbitrary resource usage for this DRB. Note, however, that in certain instances, a "link availability" does not necessary mean that resources in the schedule are "dedicated" to the TX UE for transmission. Instead, such may serve to help the TX UE to avoid selecting a resource where the peer UE is unwilling to be used for receiving. A TX UE may, for example, conduct resource selection within a boundary or the like of a peer UE's RX schedule.

For a unidirectional unicast flow (TX UE has traffic to RX UE, none in other direction), UE 1 (see FIG. 3) may include one or more QoS parameters (e.g., data rate/periodicity, delay budget, etc.) along with proposed AS layer configurations in an RRC message 1 (e.g., may comprise an RRCConnectionSetupRequest, an RRCConnectionReconfiguration, or the like). UE 2 (again see FIG. 3) may determine the high-level "link availability" for this flow, and include it in response message (e.g., an RRC message 2). In certain instances, a link availability schedule may comprise a so-called "whitelist" based on resources available for reception. Conversely, in certain instances, a link availability schedule may comprise a so-called "blacklist" based on resources not available for reception. In still another example, a bitmap or other like data set may be used to indicate both resources that are available and are not available for reception. In certain example implementations, a Message 2 may also be used to represent a failure in negotiation, e.g., if UE 2 is so busy/congested and QoS demand from UE 1 is deemed to be too high to support.

In certain example implementations as part of a sidelink scheduler 240 (see FIG. 2), an RRC process or other like sidelink establishment procedure may be configured to support a bidirectional flow sidelink unicast communication. Here, for example, suppose an RRC process or other like procedure is to negotiate parameters for bi-directional flow (reciprocal traffic). Accordingly, in this situation, each peer UE acts as a TX UE and also as a RX UE. Thus, link availability schedule(s) may comprise TX/RX scheduling. Depending on an estimated traffic amount or some other aspect peer UEs may agree on different TX/RX splits (e.g., 50/50, 60/40 or 40/60, . . . 80/20 or 20/80, etc.) An RRC process or other like procedure may be configured to allow a more extensive negotiation process to occur, e.g., as both UEs may need to examine its own link availability schedule and the peer UE's link availability schedule to agree upon one or more sidelink schedules and/or candidate or alternate sidelink schedules. In certain instances, such processes may comprise a 3-way or 4-way "handshake" based process or the like. Note that the TX/RX schedule(s) that may be exchanged in some implementations may be considered somewhat "raw" and still subject to a final resource selection agreement, because some sidelink communication may use a common channel shared with other UEs in proximity, such that every slot/subframe may still be up for contention. In certain instances, bidirectional flow sidelink schedule negotiation may also be supported by establishing at least two unidirectional flows, each of which may be individually negotiated, e.g., as previously described.

An example Tx/Rx schedule negotiation may comprise a two-step process in which a combined TX/RX sidelink schedule may be established based, at least in part, on the link availability schedules of the UEs. Here, for example, in a first step, each UE may share sidelink negotiation information corresponding to their individual TX/RX available and/or TX/RX non-availability, e.g., based, at least in part on respective link availability schedules, etc. In certain example implementations such information may comprise bitmaps or other like easily comparable data formats. Two applicable bitmaps, e.g., one from each UE, may be processed (e.g., applying a logical AND operation, etc.) to quickly identify commonality regarding the blocks (e.g., each comprising one or more slots). In a second step, the UEs may determine which of these available blocks or portions thereof may comprise TX slots and RX slots, or the like. Such a determination may, for example, take into account a QoS or other like aspect associated with a sidelink unicast communication. If the resulting TX/RX (and possibly unavailable) candidate sidelink schedule may not satisfy a QoS of the DRB, then the attempted sidelink connection may be deemed to have failed. However, in some instances, it may be determined that the QoS or other pertinent factor may be changed in some manner (e.g., lowered, degraded, etc.) to allow the attempted sidelink connection to continue accordingly. Indeed, as described in greater detail below, in certain situations, it may be useful for the UEs to adapt/reconfigure sidelink unicast connections in a dynamic manner, e.g., to account for changing conditions, etc.

Another example Tx/Rx schedule negotiation may comprise a one-step process in which a combined TX/RX sidelink schedule may be established based, at least in part, on the link availability schedules of the UEs. Here, for example, a UE1 may propose one or more TX/RX sidelink schedules to a UE2. A candidate sidelink schedule may, for example, be based at least in part on knowledge of the traffic demands (in both directions) and applicable constraints on UE1 (e.g., QoS, data, timing, etc.). In response, if two or more candidate sidelink schedules have been proved, the UE2 may select one that is deemed acceptable. In certain instances, the UE1 may indicate a priority or preference with regard to each of the candidate sidelink schedules, e.g., so as to inform the UE2 as to a preferred order of selection. The UE2 may send an indication of a selected candidate sidelink schedule to the UE1. Also, as mentioned, in some implementations, the UE1 and UE2 may be configured to allow dynamic changes, such as, changing from one candidate sidelink schedule to another at various times, e.g., by sending an applicable indication, etc. If the UE2 is unable to agree with the candidate schedule(s) as presented by UE1, then UE2 may reject the message (and optionally include one or more alternative candidate sidelink schedules for UE1 to consider). In certain example implementations, As suggested, in certain implementations, it may be useful for the UEs to dynamically change or otherwise adjust the sidelink schedule being used. For example, a change may be useful if one of the UEs has engaged new traffic and as such needs to alter the RX portion of the sidelink schedule. In another example, with regard to the TX portion of the sidelink schedule, a change may be useful to a UE having some bursty traffic for a flow.

In certain example implementations, one or more sidelink schedules may be re-negotiated by restarting the negotiation/connection processes, e.g., as previously described. Thus, by way of an RRC reconfiguration, new sidelink schedule(s) may be negotiated for the DRB. However, some delay may be expected.

In another example, a sidelink schedule may be quickly changed based on an indication from one UE to the other UE to switch to a different sidelink schedule within a set of candidate sidelink schedules previously considered. Here, for example, such example sidelink schedule changes may be performed via MAC CE (e.g., L2 signaling, or the like), with a set of candidate sidelink schedules being pre-negotiated, e.g., during RRC. MAC CE may, for example, respond to an indication (e.g., an index, identifier, etc.) of the new sidelink schedule to trigger a switch with the new schedule so the UE may adjust its resource selection bounds correspondingly.

A sidelink schedule may comprise various formats depending upon the situation, design aspects, or the like. In certain non-limiting example implementations, a sidelink schedule may indicate a schedule granularity, e.g., for blocks or slots being considered. For example, a schedule granularity may indicate 1, 5, 10, 20, 50, . . . , M subframes, e.g., depending on a latency requirement. If a "N-subframe" time period is blocked by an RX UE as not eligible for "RX", then traffic arrival during such time period may suffer a delay up to N subframes. A sidelink schedule may also be indicative of its purpose or type, e.g., an Rx-only schedule (link availability), or TX/RX schedule. A sidelink schedule may also indicate a corresponding starting frame (e.g., timing offset) and periodicity, e.g., for the bitmap configuration. In some instances, a common configuration may be pre-configured or network-configured in RRC signaling, possibly allowing an index or the like to be used.

Figure 6:
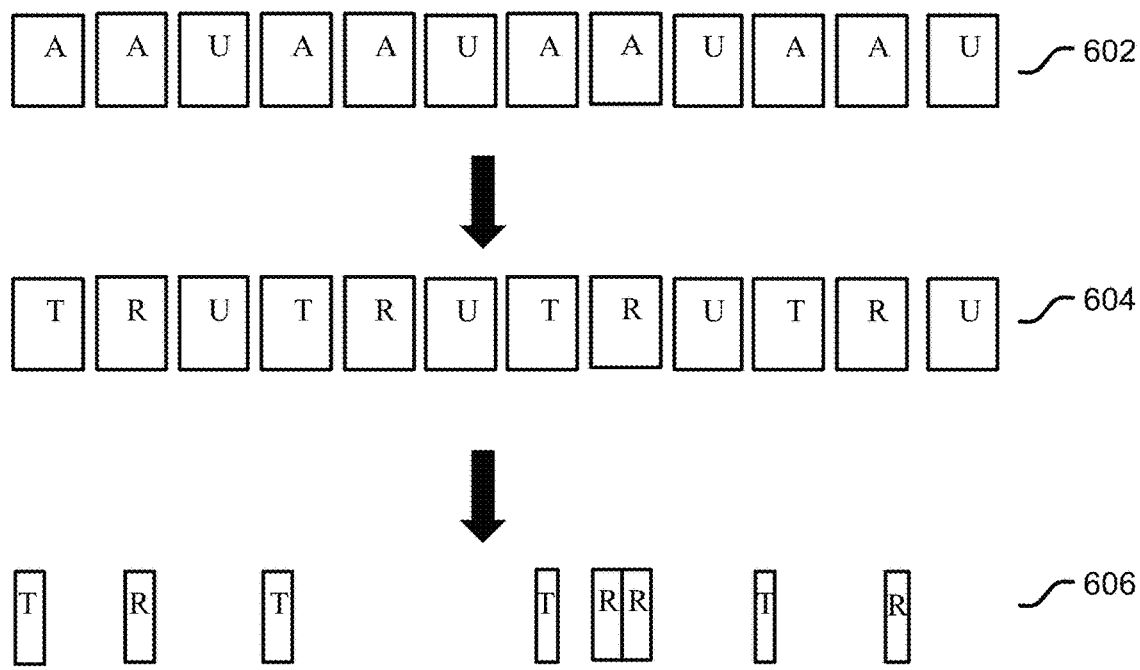
FIG. 6, FIG. 7 and FIG. 8 illustrate some resources as indicated as part of some example scheduling processes, in accordance with certain aspects of the present disclosure.

Attention is drawn next to FIG. 6 which illustrates aspects of an example sidelink scheduling process 600, in accordance with certain aspects of the present disclosure. Here, an example "raw" schedule 602 illustrates available resources for a UE marked with an "A", which may be used for transmit or receive, and other unavailable resources marked with a "U". This raw schedule may comprise or be based at least in part on a link availability schedule and/or communication resource allocation. A corresponding proposed sidelink schedule 604, which may be provided or otherwise indicated in sidelink negotiation information to a peer UE, shows that certain "A" marked resources in the raw schedule 602 may be purposed accordingly for possible transmission (marked with a "T") or possible reception (marked with an "R). A further corresponding example candidate sidelink schedule 606 may be negotiated in which the resources may be reduced to match a desired granularity, parameter, etc. As illustrated by the reduced width of candidate sidelink scheduled 606 compared to the proposed sidelink schedule 604, the granularity has been reduced (at least with regard to time) for the resources to be used. Similarly, a granularity with regard to frequency may also change as a sidelink schedule becomes agreed to during negotiation.

Figure 7:
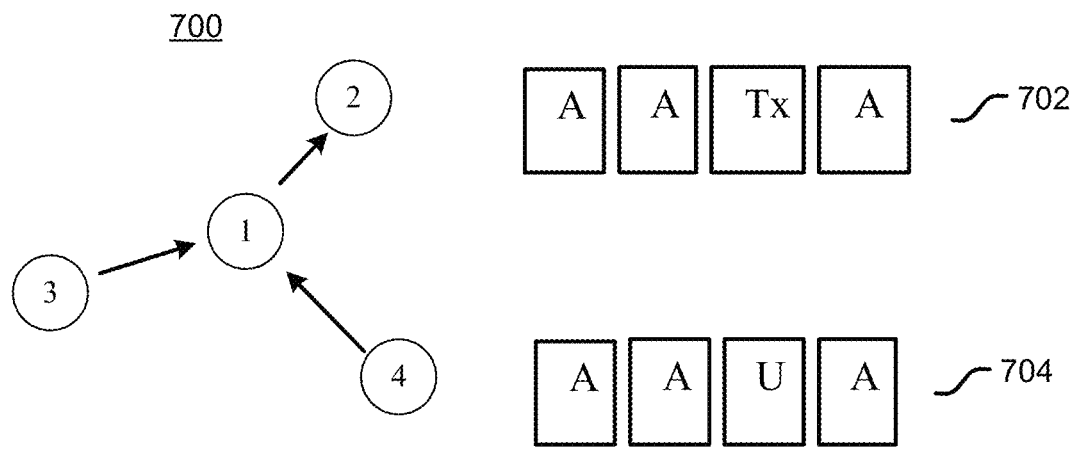

FIG. 7 shows an example situation 700 in which a UE1 may need to be involved in sidelink communication with a plurality of UEs. Here, there may be a need to determine a "link availability" schedule involving multiple links. In this example, UE1 may currently be using some resources to TX to UE 2 in consideration of link availability schedule 702, while other available resources are not used. UE3 and UE 4 may each intend to establish a unidirectional flow to UE 1, and thus, for example, UE1 may use or otherwise indicate link availability scheduled 704. Thus, UE3 and UE4 may each attempt to negotiate use of the "A" (available) blocks but not the "U" block corresponding to the TX block of schedule 702. It should be understood, that UE1 may receive during the three "A" blocks in both schedule 702 and 704.

Figure 8:
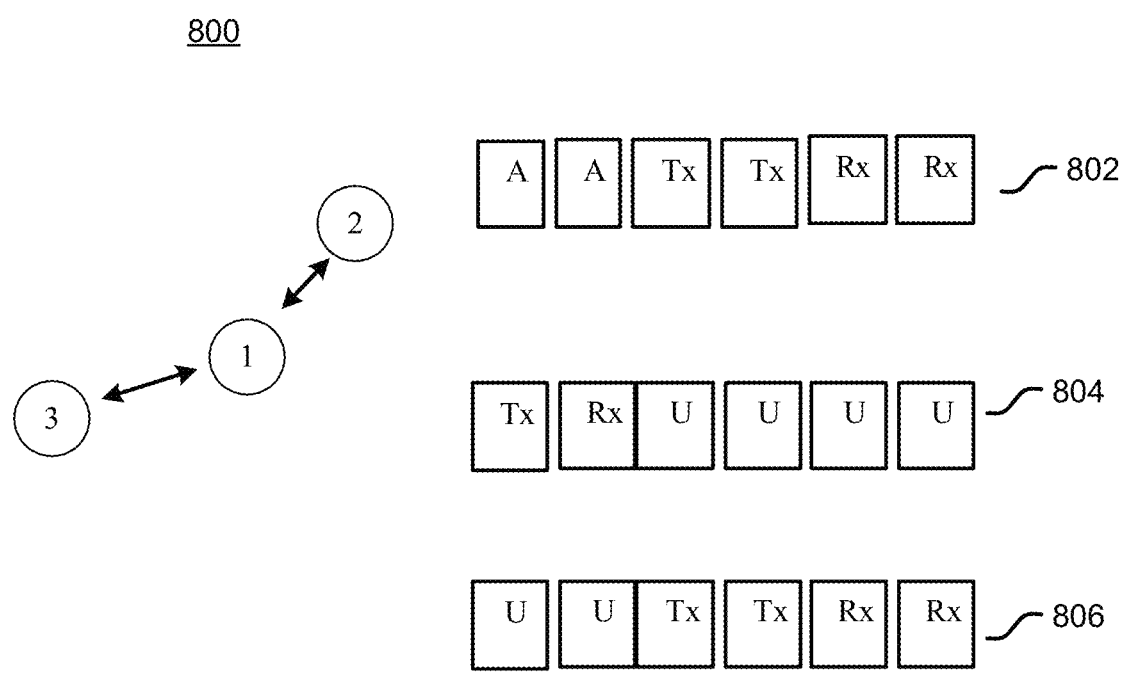

FIG. 8 shows an example situation 800 in which a UE1 may need to be involved in sidelink communication with a plurality of UEs. Here, there may be a need to determine a "TX/RX/U" schedule involving multiple links. In this example, UE1 may be currently using some resource to TX/RX with UE2, other resources are not used, e.g., in consideration of link availability schedule 802. If UE1 intends to establish a bidirectional flow to UE3, then UE1 may consider using link availability schedule 804 in the negotiation with UE3, which orthogonizes the two links (UE1-UE2, and UE1-UE3) in time domain. Here, UE3 may propose to in RX mode in block 2, while UE2 is in an RX mode in blocks 3 and slot 4. Alternatively, with reference to example link availability schedule 806, UE1 may propose to reuse the part or all of the T/R slots for both UE1-UE2 and UE1-UE3 links, and keep unused slots for future use.

Attention is drawn next to FIG. 9, which is a flow-diagram illustrating an example method 900 for use in a UE, for example, as in FIG. 2, configured for sidelink unicast communication based, at least in part, on one or more sidelink schedule(s), in accordance with certain aspects of the present disclosure.

At example block 902, a first UE may obtain a link availability schedule indicating, at least in part, communication resources available for use by at least the first UE for sidelink unicast communication. By way of some examples, all or part of a link availability schedule may be based, at least in part, on local processing, configuration or other like usage considerations of the first UE, communication resource allocations associated with one or more networks, or the like or some combination thereof.

At example block 904, the first UE may identify a second UE to attempt to engage in a sidelink unicast communication. Here, for example, the first UE may identify the second UE based, at least in part, on signals received from the second UE, and/or signals received from one or more other devices, preconfigured information stored in a memory of the UE, sensor-based information, user inputs, etc.

At example block 906, the first UE may establish a sidelink schedule with the second UE. Here, for example, the sidelink schedule may correspond to at least a subset of the communication resources indicated by the link availability schedule. At optional block 908, the first UE may exchange sidelink negotiation information with the second UE. At optional block 910, the first UE may receive sidelink negotiation information from the second UE. At optional block 912, the first UE may identify that one of two or more candidate sidelink schedules is serve as the sidelink schedule. At optional block 914, the first UE may receive an indication from the second UE that one of two or more candidate sidelink schedules is serve as the sidelink schedule.

At example block 916, the first UE may establish a sidelink with the second UE, and at example block 918, the first UE may communicate (transmit and/or receive), via the sidelink, with the second UE using at least a portion of the communication resources per the sidelink schedule.

It should be noted that the methods described herein describe possible implementations, and that the operations and the steps may be rearranged or otherwise modified and that other implementations are possible. Further, aspects from two or more of the methods may be combined.

The electromagnetic spectrum is often subdivided by various authors/entities into differently identified classes, bands, channels, etc., based on frequency/wavelength. For example, a portion of the electromagnetic spectrum from 30 Hz to 300 GHz is commonly known as the radio spectrum with the corresponding electromagnetic waves often called radio waves.

The International Telecommunications Union (ITU), for example, currently identifies twelve differently named bands in the radio spectrum based on powers of ten meters of wavelength. Here, for example, of particular interest to modern wireless communications are certain radio frequencies/bands within the ITU's very high frequency (VHF) band (30 MHZ-300 MHz), ultra-high frequency (UHF) band (300 MHz-3000 MHz), super high frequency (SHF) band (3000 MHz-30000 MHz), and/or extremely high frequency (EHF) band (30000 MHz-300000 MHz).

In another example, the Institute of Electrical and Electronics Engineers (IEEE) recognizes the same VHF and UHF bands of the ITU, but divides the radio spectrum (300 MHz-300000 MHz), corresponding to the ITU's UHF, SHF and EHF bands, into ten differently named bands.

One of the issues that may arise from having different authors/entities naming portions of the radio spectrum is that some potential confusion may arise. For example, the ITU's EHF band (30000 MHz-300000 MHz) corresponds to wavelengths between 1 mm and 10 mm and as such is often referred to a millimeter wave band. However, the (narrower) IEEE band designated as the "G" band (110000 MHz-300000 MHz) is also often referred to as a millimeter wave band.

For 5G new radio (NR), two initial operating bands have been identified as frequency range designations FR1 (410 MHz-7125 MHz) and FR2 (24250 MHz-52600 MHz). It is expected that other frequency range designations may be identified for 5G, or later generations. Even though a portion of FR1 is greater than both 6 GHz (>6000 MHz) and 7 GHz (>7000 MHz), FR1 is often referred to as a Sub-6 GHz band or a Sub-7 GHz band in various documents and articles regarding 5G NR topics. A similar nomenclature issue sometimes occurs with regard to FR2 in various documents and articles regarding 5G NR topics. While a portion of FR2 is less than 30 GHz (<30000 MHz, e.g., the lower end of the EHF band), FR2 is often referred to as a millimeter wave band in various documents and articles regarding 5G NR topics. Additionally, all or some of the frequencies between the upper bound of FR1 (currently, 7125 MHz) and the lower band of FR2 (currently, 24250 MHz) are often referred to as mid-band frequencies.

With the above aspects in mind, unless specifically stated otherwise, it should be understood that the term "sub-6 GHz" or the like if used herein by way of example may represent all or part of FR1 for 5G NR. Further, unless specifically stated otherwise, it should be understood that the term "millimeter wave" if used herein by way of example may represent all or part of FR2 for 5G NR, and/or all or part of the EHF band.

It should also be understood that the terms "sub-6 GHz" and "millimeter wave" are also intended herein to represent modifications to such example frequency bands that may occur do to author/entity decisions regarding wireless communications, e.g., as presented by example herein. For example, unless specifically stated otherwise, it should be understood that the terms "sub-6 GHz" or "millimeter wave" if used herein may also represent respective (non-overlapping) portions of the so-called mid-band frequencies.

It should be understood that the above examples are not necessarily intended to limit claimed subject matter. For example, unless specifically recited, claimed subject matter relating to wireless communications is not necessarily intended to be limited to any particular author/entity defined frequency band, or the like.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs with service subscriptions with the network provider. A small cell may be associated with a lower-powered base station, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications systems described herein may support synchronous or asynchronous operation. For synchronous operation, the UEs may have similar frame timing, and transmissions from different UEs may be approximately aligned in time. For asynchronous operation, the UEs may have different frame timing, and transmissions from different UEs may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA, or other PLD, discrete gate or transistor logic, discrete hardware components, or any combination thereof designed to perform the functions described herein, e.g., with regard to one or more processing units. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for use in sidelink unicast communication, the method comprising, at a first user equipment (UE):
   obtaining a link availability schedule indicating, at least in part, communication resources available for use by at least the first UE for sidelink unicast communication;
   identifying a second UE to attempt to engage in a sidelink unicast communication;
   establishing a sidelink schedule with the second UE, the sidelink schedule corresponding to at least a subset of the communication resources indicated by the link availability schedule,
      wherein at least one of:
         the link availability schedule indicates whether at least one communication resource, of the communication resources, is designated for a transmission, or a reception, of a signal by the first UE, or
         the sidelink schedule indicates whether at least another communication resource, of other communication resources and corresponding to at least a portion of the at least one communication resource, is designated for the transmission, or the reception, of the signal by the first UE;
   establishing a sidelink with the second UE; and
   communicating, via the sidelink, with the second UE based on the sidelink schedule.

2. The method as recited in claim 1 wherein establishing the sidelink schedule comprises exchanging sidelink negotiation information with the second UE, wherein at least a portion of the sidelink negotiation information provided by the first UE to the second UE is based, at least in part, on the link availability schedule.

3. The method as recited in claim 2, wherein at least a portion of the sidelink negotiation information is indicative of at least one quality of service (QoS) parameter corresponding to the sidelink unicast communication.

4. The method as recited in claim 2, wherein at least a portion of the sidelink negotiation information is exchanged as part of an RRC procedure, or as part of a MAC procedure.

5. The method as recited in claim 1, wherein the sidelink schedule comprises two or more candidate sidelink schedules that are acceptable to the first UE and the second UE.

6. The method as recited in claim 1, wherein the sidelink schedule indicates whether the at least another communication resource is designated for the transmission, or the reception, of the signal by the first UE.

7. The method as recited in claim 1, wherein the link availability schedule is based, at least in part, on a network defined communication resource allocation.

8. The method as recited in claim 1, wherein the sidelink schedule is indicative of a network-related timing offset for at least one communication resource for use by the first UE to transmit to the second UE via the sidelink.

9. The method as recited in claim 1, wherein the sidelink comprises a personal communication service (PCS) communication link.

10. A first user equipment (UE) comprising:
a memory; and
one or more processing units coupled to the memory, wherein the one or more processing units are configured to:
access a link availability schedule stored in the memory which indicates, at least in part, communication resources available for use by at least the first UE for sidelink unicast communication;
identify a second UE to attempt to engage in a sidelink unicast communication;
communicate, with the second UE, to establish a sidelink schedule corresponding to at least a subset of the communication resources indicated by the link availability schedule,
wherein at least one of:
the link availability schedule indicates whether at least one communication resource, of the communication resources, is designated for a transmission, or a reception, of a signal by the first UE, or
the sidelink schedule indicates whether at least another communication resource, of other communication resources and corresponding to at least a portion of the at least one communication resource, is designated for the transmission, or the reception, of the signal by the first UE; and
communicate with the second UE over a sidelink based on the sidelink schedule.

11. The first UE as recited in claim 10, wherein the one or more processing units are further configured to exchange sidelink negotiation information with the second UE, and wherein at least a portion of the sidelink negotiation information provided by the first UE to the second UE is based, at least in part, on the link availability schedule.

12. The first UE as recited in claim 11, wherein at least a portion of the sidelink negotiation information is indicative of at least one quality of service (QoS) parameter corresponding to the sidelink unicast communication.

13. The first UE as recited in claim 11, wherein at least a portion of the sidelink negotiation information is exchanged as part of an RRC procedure, or as part of a MAC procedure.

14. The first UE as recited in claim 10, wherein the sidelink schedule comprises two or more candidate sidelink schedules that are acceptable to the first UE and the second UE.

15. The first UE as recited in claim 14, wherein the one or more processing units are further configured to identify that one of the two or more candidate sidelink schedules is to serve as the sidelink schedule for at least the transmission of the signal to the second UE via the sidelink.

16. The first UE as recited in claim 10, wherein the sidelink schedule indicates whether at least another communication resource, of other communication resources and corresponding to at least a portion of the at least one communication resource, is designated for the transmission, or the reception, of the signal by the first UE.

17. The first UE as recited in claim 10, wherein at least a portion of the communication resources available for use by the first UE for sidelink unicast communication are also available for use by the second UE for possible sidelink unicast communication.

18. The first UE as recited in claim 10, wherein the link availability schedule is based, at least in part, on a network defined communication resource allocation.

19. The first UE as recited in claim 10, wherein the sidelink comprises:
a single unidirectional sidelink;
two unidirectional sidelinks arranged in reversed directions so as to provide bidirectional communication;
a bidirectional sidelink; or
some combination thereof.

20. The first UE as recited in claim 10, wherein the sidelink schedule is indicative of a communication resource granularity.

21. An apparatus for use at a first user equipment (UE) for sidelink unicast communication, the apparatus comprising:
means for obtaining a link availability schedule indicating, at least in part, communication resources available for use by at least the first UE for sidelink unicast communication;
means for identifying a second UE to attempt to engage in a sidelink unicast communication;
means for establishing a sidelink schedule with the second UE, the sidelink schedule corresponding to at least a subset of the communication resources indicated by the link availability schedule,
wherein at least one of:
the link availability schedule indicates whether at least one communication resource, of the communication resources, is designated for a transmission, or a reception, of a signal by the first UE, or
the sidelink schedule indicates whether at least another communication resource, of other communication resources and corresponding to at least a portion of the at least one communication resource, is designated for the transmission, or the reception, of the signal by the first UE;
means for establishing a sidelink with the second UE; and
means for communicating, via the sidelink, with the second UE based on the sidelink schedule.

22. The apparatus as recited in claim 21 wherein the means for establishing the sidelink schedule comprises:
means for exchanging sidelink negotiation information with the second UE, wherein at least a portion of the sidelink negotiation information provided by the first UE to the second UE is based, at least in part, on the link availability schedule.

23. The apparatus as recited in claim 22, wherein at least a portion of the sidelink negotiation information is indicative of at least one quality of service (QoS) parameter corresponding to the sidelink unicast communication and exchanged as part of an RRC procedure, or as part of a MAC procedure.

24. The apparatus as recited in claim 21, wherein the sidelink schedule comprises two or more candidate sidelink schedules that are acceptable to the first UE and the second UE and that are indicative of whether the at least another communication resource is designated for the transmission, or the reception, of the signal by the first UE.

25. The apparatus as recited in claim 21, wherein the link availability schedule is based, at least in part, on a network defined communication resource allocation.

26. An article of manufacture comprising:
a non-transitory computer readable medium having stored therein instructions executable by one or more processing units of a first user equipment (UE) to:
access a link availability schedule that indicates, at least in part, communication resources available for use by at least the first UE for sidelink unicast communication;

identify a second UE to attempt to engage in a sidelink unicast communication;

initiate communication with the second UE to establish a sidelink schedule corresponding to at least a subset of the communication resources indicated by the link availability schedule, wherein at least one of:

the link availability schedule indicates whether at least one communication resource, of the communication resources, is designated for a transmission, or a reception, of a signal by the first UE, or the sidelink schedule indicates whether at least another communication resource, of other communication resources and corresponding to at least a portion of the at least one communication resource, is designated for the transmission, or the reception, of the signal by the first UE; and initiate communication with the second UE over a sidelink based on the sidelink schedule.

27. The article of manufacture as recited in claim 26, wherein the instructions are further executable by one or more processing units to:

exchange sidelink negotiation information with the second UE, wherein at least a portion of the sidelink negotiation information provided by the first UE to the second UE is based, at least in part, on the link availability schedule.

28. The article of manufacture as recited in claim 27, wherein at least a portion of the sidelink negotiation information is indicative of at least one quality of service (QoS) parameter corresponding to the sidelink unicast communication, and the sidelink schedule comprises two or more candidate sidelink schedules that are acceptable to the first UE and the second UE.

29. The article of manufacture as recited in claim 26, wherein at least a portion of the communication resources available for use by the first UE for sidelink unicast communication are also available for use by the second UE for possible sidelink unicast communication.

30. The article of manufacture as recited in claim 26, wherein the link availability schedule is based, at least in part, on a network defined communication resource allocation.

* * * * *